United States Patent
Kong et al.

(10) Patent No.: US 8,115,413 B2
(45) Date of Patent: Feb. 14, 2012

(54) MODULE FOR CONTROLLING LIGHT EMITTING DIODE CURRENT FOR SELECTIVE FEEDBACK, APPARATUS AND METHOD FOR DRIVING LIGHT EMITTING DIODES USING THE SAME

(75) Inventors: Seung Kon Kong, Seongnam-si (KR); Bo Hyun Hwang, Seoul (KR); Jung Hyun Kim, Suwon-si (KR); Jung Sun Kwon, Suwon-si (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 252 days.

(21) Appl. No.: 12/629,552

(22) Filed: Dec. 2, 2009

(65) Prior Publication Data

US 2011/0050128 A1  Mar. 3, 2011

(30) Foreign Application Priority Data

Aug. 31, 2009  (KR) .................. 10-2009-0081539

(51) Int. Cl.
*G05F 1/00* (2006.01)
(52) U.S. Cl. ........ 315/295; 315/294; 315/291; 315/312; 315/319; 345/82; 345/212; 345/204; 345/210
(58) Field of Classification Search .................. 315/291, 315/294, 295, 297, 312, 318, 319, 224, 247; 345/82, 95, 102, 212, 204, 210, 690; 327/538
See application file for complete search history.

(56) References Cited

U.S. PATENT DOCUMENTS

| | | | |
|---|---|---|---|
| 7,948,455 B2 * | 5/2011 | Han et al. | 345/82 |
| 2010/0060175 A1 * | 3/2010 | Lethellier | 315/164 |
| 2010/0156315 A1 * | 6/2010 | Zhao et al. | 315/294 |

FOREIGN PATENT DOCUMENTS

| | | |
|---|---|---|
| JP | 2007-318983 A | 12/2007 |
| KR | 1020080034316 A | 4/2008 |

* cited by examiner

*Primary Examiner* — Haiss Philogene
(74) *Attorney, Agent, or Firm* — Lowe, Hauptman, Ham & Berner, LLP

(57) ABSTRACT

The present invention provides a module for controlling an LED current for selective feedback, an apparatus and a method for driving LEDs using the same. The module for controlling the LED current, which is connected to a plurality of LED channels receiving driving powers supplied from at least one DC/DC converter and controls currents of the LED channels through a constant current, the LED current controlling module includes: an operation mode selector for selecting an operation mode according to an inputted enable signal level; a channel divider for dividing a plurality of LED channels into at least one group according to the selected operation mode; and a minimum voltage selector for selecting an LED channel with a minimum voltage, obtained by comparing voltages detected from each of lower ends of the LED channels included in each of one or more divided groups.

14 Claims, 3 Drawing Sheets

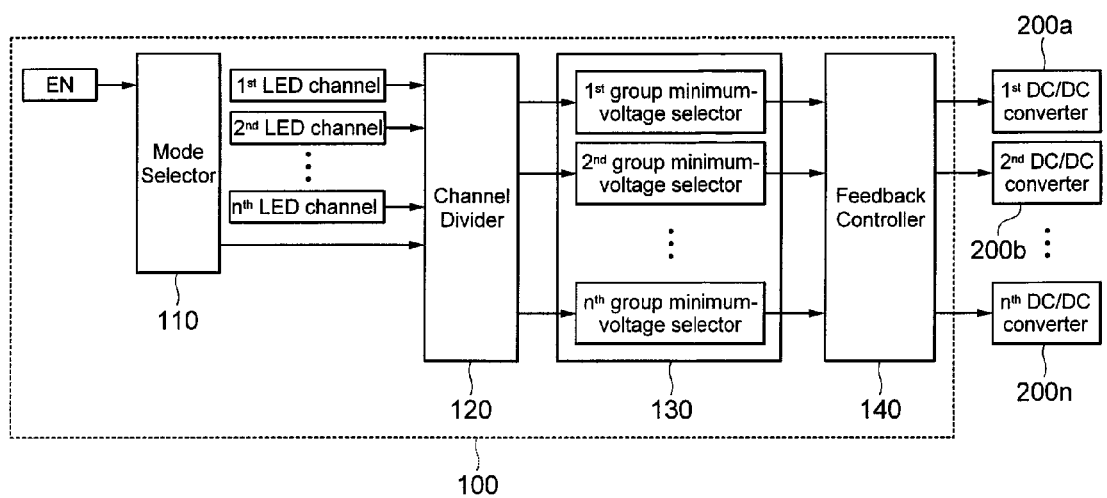
[FIG. 1]

[FIG. 2]
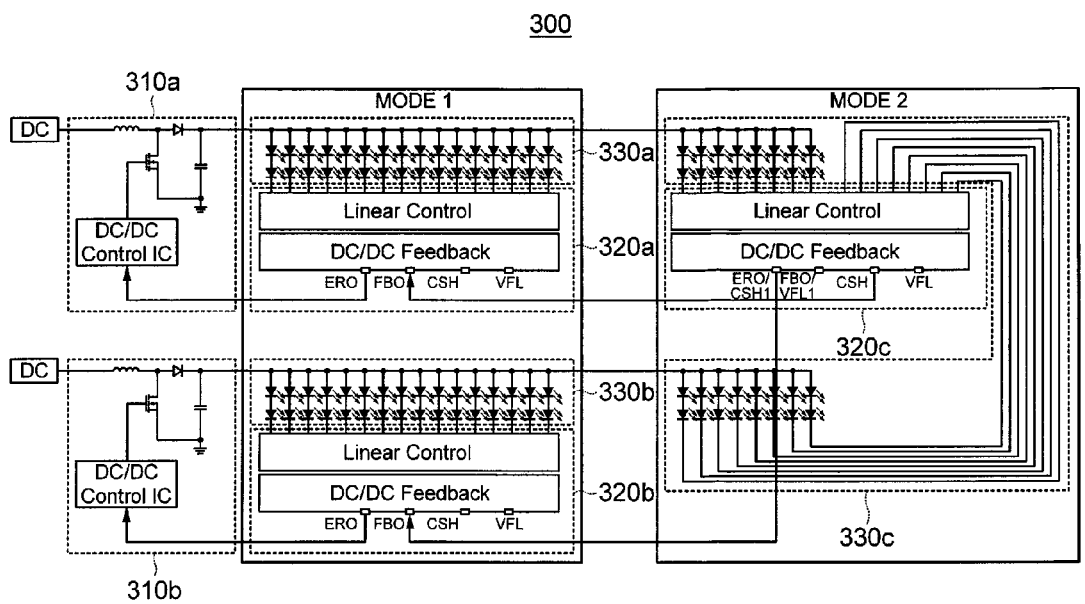

[FIG. 3]
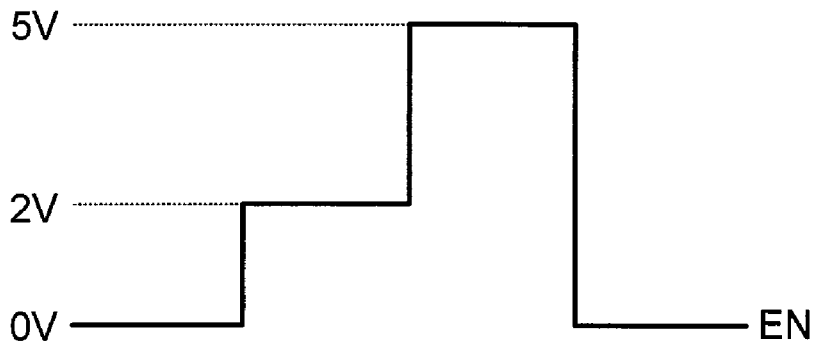
[FIG. 4]
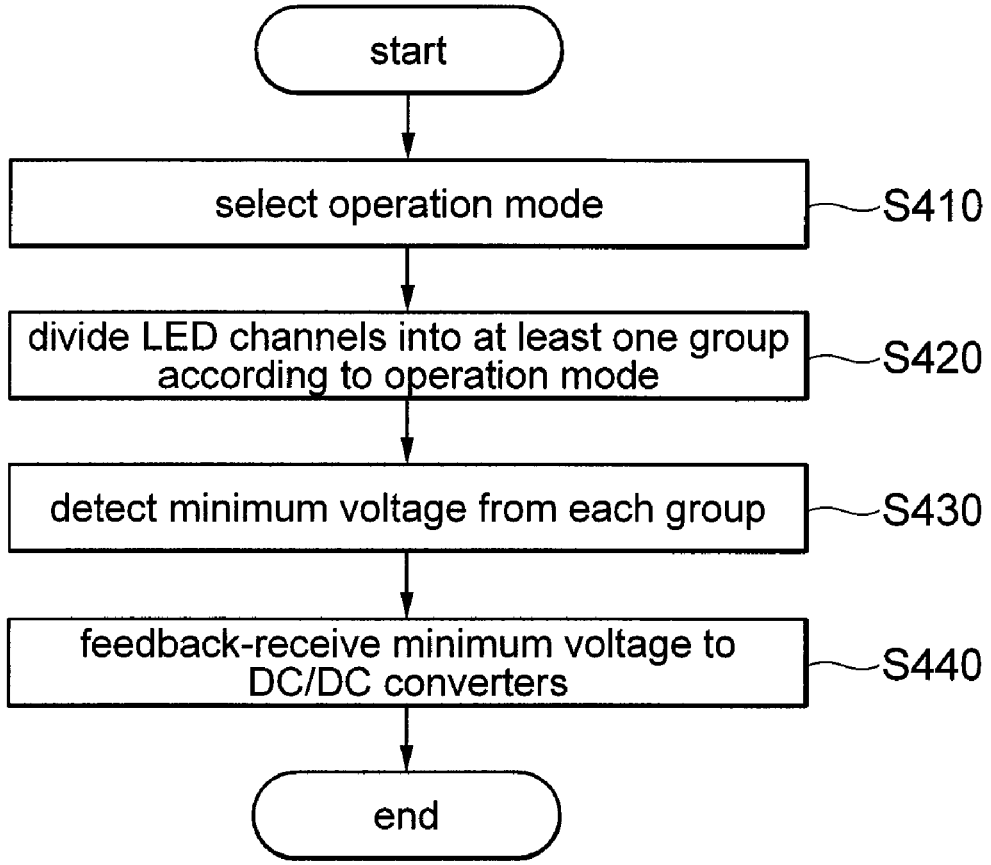

MODULE FOR CONTROLLING LIGHT EMITTING DIODE CURRENT FOR SELECTIVE FEEDBACK, APPARATUS AND METHOD FOR DRIVING LIGHT EMITTING DIODES USING THE SAME

CROSS-REFERENCE TO RELATED APPLICATIONS

This application claims the benefit of Korean Patent Application No. 10-2009-0081539 filed with the Korea Intellectual Property Office on Aug. 31, 2009, the disclosure of which is incorporated herein by reference

BACKGROUND OF THE INVENTION

1. Field of the Invention

The present invention relates to a module for controlling a Light Emitting Diode (LED) current for selective feedback so as to control constant currents of LED channels, an apparatus and a method for driving LEDs using the same.

2. Description of the Related Art

In general, a liquid crystal display refers to a device which displays a desired image according to an amount of light transmitted on an upper substrate of being a surface on which the desired image is displayed, by controlling an intensity of an electric field formed at the liquid crystal layer to thereby modify a molecular order of a liquid crystal material after forming a liquid crystal layer with anisotropic permittivity between upper and lower substrates of being transparent insulating substrates.

Since the liquid crystal display is a non-emissive display device incapable of emitting light by itself, it needs a back light which is installed on a rear surface of a liquid crystal panel which displays an image so that all screens can be maintained at the same brightness level.

A Cold Cathode Fluorescent Lamp (CCFL) or an External Electrode Fluorescent Lamp (EEFL) has been used as a light source of a back light for a liquid crystal display. However, an LED lamp has recently been in the spotlight as a next-generation light source which has characteristics of superior effects than the CCFL or the EEFL in terms of energy reduction and semi-permanent use.

Until now, an LED has been mainly used just as a light source of a back light for a liquid crystal display, such as a mobile phone. However, as luminance of an LED has become improved, a use range of the LED is enlarged to include a light source of the back light for a large-sized liquid crystal display.

An apparatus for driving an LED in the prior art includes at least one LED driving unit for driving a plurality of LED channels, and at least one DC/DC converter.

In general, since an error generated during product's production causes a difference between forward voltages even if each of LED elements is designed to have the same forward voltage, a lower end voltage of the LED channel is feedback-received to thereby control an output voltage of the DC/DC converter so as to maintain constant luminance.

The DC/DC converter boosts a voltage inputted from a power source to transfer the resultant voltage to an LED channel so as to maintain luminance of the LED channel. At lower ends of a plurality of LED channels, a linear controller for controlling a current of each channel to be constant, and a feedback controller for feedback-receiving a lower end voltage or current of each channel may be included.

There is a limit in the number of LED channels and the number of the LED driving unit which may be driven based on performance of one DC/DC converter. In the case where the LED driving unit is manufactured in a module form, there is a limit in the number of connectable LED channels as well.

Therefore, when a back light unit is implemented by using a plurality of LEDs, the above-described limits result in restrictions on arrangement of a plurality of LEDs. In addition, LEDs may be connected to only a part of pins in the LED driving module since there is a limit in the number of the LEDs operable in one DC/DC converter, which results in connection inefficiency between the LEDs and the pins.

SUMMARY OF THE INVENTION

The present invention has been proposed in order to overcome the above-described problems and it is, therefore, an object of the present invention to provide a module for controlling an LED current for selective feedback, which divides a plurality of LEDs connected to an LED current controlling module into at least one group according to an operation mode, detects a minimum lower end voltage of an LED channel in each group, and selectively feedback-receives the detected voltage to DC/DC converters which drive corresponding LED channels, and an apparatus and a method for driving LEDs using the same.

In accordance with one aspect of the present invention to achieve the object, there is provided an LED current controlling module which is connected to a plurality of LED channels receiving driving powers supplied from at least one DC/DC converter and controls currents of the LED channels through a constant current, the LED current controlling module including: an operation mode selector for selecting an operation mode according to an inputted enable signal level; a channel divider for dividing a plurality of LED channels into at least one group according to the selected operation mode; and a minimum voltage selector for selecting an LED channel with a minimum voltage, obtained by comparing voltages detected from each of lower ends of the LED channels included in each of one or more divided groups.

Also, the LED current controlling module further includes a feedback controller for transferring a minimum lower end voltage of the selected LED channel to a DC/DC converter supplying a driving power to the LED channel.

Also, it is preferable that the enable signal level of the operation mode selector has three signal levels.

Also, the operation mode includes a first operation mode based on the fact that the plurality of LED channels receive a driving power supplied from an identical DC/DC converter, and a second operation mode based on the fact that the plurality of LED channels receive a driving power supplied from at least two DC/DC converters, and the operation mode selector selects one of the first and second operation modes according to the inputted enable signal.

Also, the channel divider divides a plurality of LED channels into one group when the operation mode selector selects the first operation mode, and divides a plurality of LED channels into an LED channel group which receives a driving power supplied from the identical DC/DC converter when the operation mode selector selects the second operation mode.

In accordance with still another aspect of the present invention to achieve the object, there is provided an apparatus for driving LEDs including: light source units including a plurality of LED channels connected to be parallel to one another; at least one DC/DC converter for supplying a driving power to the light source units; at least one LED current controlling module connected to LEDs, selected from among a plurality of LED channels included in the light source units to have the same number as a preset number, said at least one LED current controlling module which determines an operation mode of the plurality of the connected LED channels according to an enable signal, divides the connected LED channels into at least one group, selects a minimum voltage of voltages for LED channels included in each group, and feedback-receives the selected voltage to the DC/DC converter; and an enable signal distributor for distributing an enable signal corresponding to a preset operation mode of said at least one LED current controlling module into each of the LED current controlling modules.

Also, it is preferable that the enable signal distributor distributes an enable signal according to whether a plurality of LED channels connected to the LED current controlling modules receive a driving power supplied from either an identical DC/DC converter or at least two DC/DC converters.

Also, it is preferable that the LED current controlling module includes: an operation mode selector for selecting an operation mode according to an inputted enable signal level; a channel divider for dividing a plurality of the connected LED channels into at least one group, according to the selected operation mode; a minimum voltage selector for selecting an LED channel with a minimum voltage obtained by comparing voltages of each of lower ends of the LED channels included in each of at least one divided group; and a feedback controller for transferring a minimum lower end voltage of the selected LED channel to the DC/DC converter that supplies a driving power to the LED channel.

Also, it is preferable that the enable signal level of the operation mode selector has three signal levels.

Also, it is preferable that the operation mode includes a first operation mode based on the fact that the plurality of LED channels receive a driving power supplied from the identical DC/DC converter, and a second operation mode based on the fact that the plurality of LED channels receive a driving power supplied from at least two DC/DC converters, and the operation mode selector selects one of the first and second operation modes according to an inputted enable signal.

Also, it is preferable that the channel divider divides the plurality of LED channels into one group when the operation mode selector selects the first operation mode, and the channel divider divides the plurality of LED channels into an LED group that receives a driving power supplied from the identical DC/DC converter.

In accordance with still another aspect of the present invention to achieve the object, there is provided a method for driving LEDs in an LED current controlling module which is connected to a plurality of LED channels and controls currents of the LED channels through a constant current, the method including the steps of: selecting an operation mode according to an inputted enable signal level; dividing the plurality of LED channels into at least one group according to the selected operation mode; selecting an LED channel with a minimum voltage, obtained by comparing voltages of lower ends of LED channels included in each of one or more divided groups; and feedback-receiving a voltage of the selected LED to a DC/DC converter that supplies a driving power to an LED channel of each group.

Also, preferably, in the step of selecting the operation mode according to the inputted enable signal level, one of a first operation mode and a second operation mode is selected, wherein the first operation mode being based on the fact that the plurality of LED channels receive a driving power supplied from an identical DC/DC converter, and the second operation mode being based on the fact that the plurality of LED channels receive a driving power supplied from at least two DC/DC converters.

Also, preferably, in the step of dividing the plurality of LED channels into said at least one group according to the selected operation mode, the plurality of LED channels are divided into one group when the first operation mode is selected, and the plurality of LED channels are divided into an LED channel group which receives a driving power supplied from the identical DC/DC converter when the second operation mode is selected.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a block diagram showing an LED current controlling module in accordance with an embodiment of the present invention;

FIG. 2 is a circuit diagram showing an apparatus for driving LEDs in accordance with an embodiment of the present invention;

FIG. 3 is a waveform diagram showing an enable signal for driving an LED current controlling module in accordance with an embodiment of the present invention; and FIG. 4 is a flowchart showing a method for driving LEDs in accordance with an embodiment of the present invention.

DETAILED DESCRIPTION OF THE PREFERABLE EMBODIMENTS

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of related art are omitted when it is deemed that they may unnecessarily obscure the essence of the invention.

Embodiments of a module for controlling an LED current for selective feedback, an apparatus and a method for driving LEDs using the same in accordance with the present invention will be described in detail with reference to the accompanying drawings. When describing them with reference to the drawings, the same or corresponding component is represented by the same reference numeral and repeated description thereof will be omitted.

FIG. 1 is a block diagram showing an LED current controlling module in accordance with an embodiment of the present invention.

As shown in FIG. 1, the module for controlling an LED current 100 (hereinafter, referred to as "LED current controlling module") includes an operation mode selector 110, a channel divider 120, a minimum voltage selector 130, and a feedback controller 140.

The LED current controlling module in accordance with an embodiment of the present invention is connected to a plurality of LED channels which receive a driving power from at least one DC/DC converter, and controls currents for a plurality of LED channels through a constant current.

The operation mode selector 110 of the LED current controlling module 100 selects an operation mode according to an inputted enable signal level.

In this case, the number of the enable signal levels of the operation mode selector 110 is three. For example, as shown in FIG. 3, the enable signal levels may have three voltage signal levels of "0[V]", "2[V]", "5[V]", and may have a range of three voltage signals of "0~2[V]", "2~5[V]", "5[V] or higher."

Herein, the operation mode is classified into a first operation mode and a second operation mode. The first operation mode is based on the fact that a plurality of LED channels receive a driving power supplied from the identical DC/DC converter. The second operation mode is based on the fact that a plurality of LED channels receive a driving power supplied from at least two DC/DC converters.

The operation mode selector 110 selects one of the first and second operation modes according to the inputted enable signal.

The channel divider 120 divides a plurality of LED channels into at least one group according to the operation mode selected by the operation mode selector 110.

When the operation mode selector 110 selects the first operation mode, the channel divider 120 divides a plurality of LED channels into one group. When the operation mode selector 110 selects the second operation mode, the channel divider 120 divides a plurality of LED channels into LED channel groups which receive a driving power supplied from the identical DC/DC converter.

That is, the first operation mode is a mode in which a plurality of LEDs connected to the LED current controlling module 100 receive a driving power supplied from the identical DC/DC converter. The second operation mode is a mode in which a plurality of LEDs connected to the LED current controlling module 100 receive a driving power supplied from two or more DC/DC converters.

The minimum voltage selector 130 selects an LED channel with a minimum voltage, obtained by comparing respective voltages detected from lower ends of the LED channels included in each of one or more divided groups.

For example, when the operation mode selector 110 selects the first operation mode, the channel divider 120 divides a plurality of LED channels into one group, and selects an LED channel with a minimum voltage detected from among lower end voltages of LED channels included in one group.

Also, when the operation mode selector 110 selects the second operation mode, the channel divider 120 divides LED channels, receiving a driving power supplied from the identical DC/DC converter, from among a plurality of LED channels, into an identical group. The minimum voltage selector 130 selects LED channels having minimum lower end voltages of the LED channels included in each of the group, respectively.

When the second operation mode is selected, the minimum voltage selector 130 selects LED channels having minimum lower end voltages of respective channels from two or more groups, so LED channels with minimum lower end voltages are selected as many as the number of divided groups.

The feedback controller 140 transmits minimum lower end voltages of the selected LED channels to DC/DC converters 200a to 200n which supply a driving power to LED channels to thereby control boost voltages of the DC/DC converters 200a to 200n.

FIG. 2 is a circuit diagram showing an apparatus for driving LEDs in accordance with an embodiment of the present invention.

As shown in FIG. 2, the apparatus for driving LEDs 300 includes light source units having a plurality of LED channels 330a to 330c connected to be parallel to one another, at least one of DC/DC converters 310a and 310b, at least one of LED current controlling modules 320a to 320c, and an enable signal distributor (not shown).

The DC/DC converters 310a and 310b supplies a driving power to light source units, respectively, and the number of the LED channels available for driving is limited according to the performance.

The LED current controlling modules 320a to 320c are connected to LEDs, which are selected as many as a preset number from a plurality of LED channels 330a to 330c included in the light source units. The LED current controlling modules 320a to 320c divide the LED channels 330a to 330c into at least one group according to an operation mode.

Also, the LED current controlling modules 320a to 320c select minimum lower end voltages of the LED channels included in each of the groups, and feedback-receive the selected minimum voltage to the DC/DC converters 310a and 310b which supply a driving power to each of the LED channels.

Each of the LED current controlling modules includes an operation mode selector 110, a channel divider 120, a minimum voltage selector 130, and a feedback controller 140, as in a case of FIG. 1.

As described above, the operation mode selector 110 of the LED current controlling module 100 selects one of the first and second modes according to an inputted enable signal.

The channel divider 120 divides a plurality of LED channels into at least one group according to an operation mode selected by the operation mode selector 110.

When the operation mode selector 110 selects the first operation mode, the channel divider 120 divides a plurality of LED channels into one group. When the operation mode selector 110 selects the second operation mode, the channel divider 120 divides a plurality of LED channels into LED channel groups which receive a driving power supplied from the identical DC/DC converter.

The minimum voltage selector 130 selects an LED channel with a minimum voltage obtained by comparing respective voltages detected from lower ends of the LED channels included in each of one or more divided groups.

Also, when the operation mode selector 110 selects the second operation mode, the channel divider 120 divides the LED channels, receiving a driving power supplied from the identical DC/DC converter, from among a plurality of LED channels, into the identical group, and then the minimum voltage selector 130 selects LED channels whose lower end voltages are minimum from among the LED channels included in each group, respectively.

The feedback controller 140 transfers a minimum voltage of the selected LED channel to the DC/DC converters 200a to 200n for supplying a driving power to the LED channels, thereby controlling boost voltages of the DC/DC converters 200a to 200n.

The enable signal distributor (not shown) distributes an enable signal, corresponding to each of the preset operation modes of one or more LED current controlling module 320a to 320c, to each of the LED current controlling modules 320a to 320c.

The enable signal distributor (not shown) distributes an enable signal according to whether a plurality of LED channels connected to the LED current controlling module receive a driving power supplied from either the identical DC/DC converter or at least two DC/DC converters.

For example, in the case where a plurality of LED channels connected to one LED current controlling module receive a driving power supplied from the identical DC/DC converter, the enable signal distributor distributes an enable signal so that the LED current controlling module is driven in the first operation mode (MODE 1). In the case where a plurality of LED channels connected to one LED current controlling module receive a driving power supplied from at least two DC/DC converters, the enable signal distributor distributes an enable signal so that the LED current controlling module is driven in the second operation mode (MODE 2).

Referring to FIG. 2, when an enable signal for selecting the first operation mode is inputted, the LED current controlling modules 320a and 320b included in the MODE 1 are driven, so a plurality of LED channels (330a or 330b) connected to one of the LED current controlling modules 320a and 320b are divided into one group, and then one LED channel with a minimum voltage detected from lower end voltages of the LED channels is selected.

The minimum lower end voltage of the LED channel is feedback-received to one of the DC/DC converters 310a and 310b which supply a driving power to the LED channel.

When an enable signal for selecting the second operation mode is inputted, a plurality of LED channels 330c connected to the LED current controlling module 320c included in the MODE 2 is divided into the groups having the same number as the DC/DC converters 310a and 310b which supply a driving power to a plurality of LED channel 330c.

That is, a plurality of LED channel 330c are divided into a first group consisting of LED channels which receive a driving power supplied from a first DC/DC converter 310a, and a second group composed of LED channels which receive a driving power supplied from a second DC/DC converter 310b.

Also, an LED channel with a minimum voltage detected from lower end voltages of LED channels from each of first and second groups is selected. A minimum lower end voltage of the LED channel selected from the first group is feedback-received to a first DC/DC converter 310a. A minimum lower end voltage of the LED selected from the second group is feedback-received to a second DC/DC converter 310b.

Therefore, through one LED current controlling module 320c, it is possible to divide the LED channel 330c, which receives driving powers supplied from different DC/DC converters 310a and 310b, into an LED channel which receives a driving power supplied from the identical DC/DC converter. In addition, it is possible to increase freedom design of a circuit since a minimum lower end voltage of the LED channels from each of divided groups is feedback-received to each of the DC/DC converters.

FIG. 4 is a flowchart showing a method for driving LEDs in accordance with an embodiment of the present invention.

As shown in FIG. 4, the method for driving LEDs in accordance with an embodiment of the present invention includes a step of selecting an operation mode according to an inputted enable signal level (step S410), and a step of dividing a plurality of LED channels into at least one group according to the selected operation mode (step S420).

Also, the method for driving the LEDs includes a step of selecting an LED channel with a minimum lower end voltage obtained by comparing voltages detected from lower ends of LED channels included in each of one or more divided groups (step S430), and a step of feedback receiving a voltage of the selected LED channel to the DC/DC converter which supplies a driving power to LED channels of each group (step S440).

In the step of selecting the operation mode (step S410), one of the first and second operation modes are selected, wherein the first operation mode is based on the fact that a plurality of LED channels receive a driving power supplied from the identical DC/DC converter, and the second operation mode is based on the fact that a plurality of LED channels receive a driving power supplied from at least two DC/DC converters.

In the step of dividing a plurality of LED channels into at least one group (step S420), a plurality of LED channels are divided into one group when the first operation mode is selected, and a plurality of LED channels are divided into an LED channel group which receives a driving power supplied from the identical DC/DC converter.

In the embodiment of the present invention, it is possible to ensure free arrangement of LED channels since the LED channels connected to an LED current controlling module are controlled to be divided into either one group or numerous groups according to an operation mode of the LED current controlling module.

Also, by using only one LED current controlling module even without separate LED current controlling modules, it is possible to control an LED channel current which receives a driving power supplied from a plurality of DC/DC converters, which causes reduction in an entire mounting area and improvement of competitive power for costs taken for configuration of the LED driving apparatus.

As described above, although the preferable embodiments of the present invention have been shown and described, it will be appreciated by those skilled in the art that substitutions, modifications and variations may be made in these embodiments without departing from the principles and spirit of the general inventive concept, the scope of which is defined in the appended claims and their equivalents.

What is claimed is:

1. An LED current controlling module which is connected to a plurality of LED channels receiving driving powers supplied from at least one DC/DC converter and controls currents of the LED channels through a constant current, the LED current controlling module comprising:
   an operation mode selector for selecting an operation mode according to an inputted enable signal level;
   a channel divider for dividing a plurality of LED channels into at least one group according to the selected operation mode; and
   a minimum voltage selector for selecting an LED channel with a minimum voltage, obtained by comparing voltages detected from each of lower ends of the LED channels included in each of one or more divided groups.

2. The LED current controlling module of claim 1, further comprising a feedback controller for transferring a minimum lower end voltage of the selected LED channel to a DC/DC converter supplying a driving power to the LED channel.

3. The LED current controlling module of claim 1, wherein the enable signal level of the operation mode selector has three signal levels.

4. The LED current controlling module of claim 1, wherein the operation mode includes a first operation mode based on the fact that the plurality of LED channels receive a driving power supplied from an identical DC/DC converter, and a second operation mode based on the fact that the plurality of LED channels receive a driving power supplied from at least two DC/DC converters, and the operation mode selector selects one of the first and second operation modes according to the inputted enable signal.

5. The LED current controlling module of claim 4, wherein the channel divider divides a plurality of LED channels into one group when the operation mode selector selects the first operation mode, and the channel divider divides a plurality of LED channels into an LED channel group which receives a driving power supplied from the identical DC/DC converter when the operation mode selector selects the second operation mode.

6. An apparatus for driving LEDs comprising:
   light source units including a plurality of LED channels connected to be parallel to one another;

at least one DC/DC converter for supplying a driving power to the light source units;

at least one LED current controlling module connected to LEDs, selected from among a plurality of LED channels included in the light source units to have the same number as a preset number, said at least one LED current controlling module which determines an operation mode of the plurality of the connected LED channels according to an enable signal, divides the connected LED channels into at least one group, selects a minimum voltage of voltages for LED channels included in each group, and feedback-receives the selected voltage to the DC/DC converter; and an enable signal distributor for distributing an enable signal corresponding to a preset operation mode of said at least one LED current controlling module into each of the LED current controlling modules.

7. The apparatus of claim 6, wherein the enable signal distributor distributes an enable signal according to whether a plurality of LED channels connected to the LED current controlling modules receive a driving power supplied from either an identical DC/DC converter or at least two DC/DC converters.

8. The apparatus of claim 6, wherein the LED current controlling module comprises:
   an operation mode selector for selecting an operation mode according to an inputted enable signal level;
   a channel divider for dividing a plurality of the connected LED channels into at least one group, according to the selected operation mode;
   a minimum voltage selector for selecting an LED channel with a minimum voltage obtained by comparing voltages of each of lower ends of the LED channels included in each of one or more divided groups; and
   a feedback controller for transferring a minimum lower end voltage of the selected LED channel to the DC/DC converter that supplies a driving power to the LED channel.

9. The apparatus of claim 8, wherein the enable signal level of the operation mode selector has three signal levels.

10. The apparatus of claim 8, wherein the operation mode includes a first operation mode based on the fact that the plurality of LED channels receive a driving power supplied from the identical DC/DC converter, and a second operation mode based on the fact that the plurality of LED channels receive a driving power supplied from at least two DC/DC converters, and the operation mode selector selects one of the first and second operation modes according to an inputted enable signal.

11. The apparatus of claim 8, wherein the channel divider divides the plurality of LED channels into one group when the operation mode selector selects the first operation mode, and the channel divider divides the plurality of LED channels into an LED group that receives a driving power supplied from the identical DC/DC converter.

12. A method for driving LEDs in an LED current controlling module which is connected to a plurality of LED channels and controls currents of the LED channels through a constant current, the method comprising the steps of:
   selecting an operation mode according to an inputted enable signal level;
   dividing the plurality of LED channels into at least one group according to the selected operation mode;
   selecting an LED channel with a minimum voltage, obtained by comparing voltages of lower ends of LED channels included in each of one or more divided groups; and
   feedback-receiving a voltage of the selected LED to a DC/DC converter that supplies a driving power to an LED channel of each group.

13. The method of claim 12, wherein, in the step of selecting the operation mode according to the inputted enable signal level, one of a first operation mode and a second operation mode is selected, wherein the first operation mode being based on the fact that the plurality of LED channels receive a driving power supplied from an identical DC/DC converter, and the second operation mode being based on the fact that the plurality of LED channels receive a driving power supplied from at least two DC/DC converters.

14. The method of claim 13, wherein, in the step of dividing the plurality of LED channels into said at least one group according to the selected operation mode, the plurality of LED channels are divided into one group when the first operation mode is selected, and the plurality of LED channels are divided into an LED channel group which receives a driving power supplied from the identical DC/DC converter when the second operation mode is selected.

* * * * *